(12) United States Patent
Shimoda et al.

(10) Patent No.: US 10,907,324 B2
(45) Date of Patent: Feb. 2, 2021

(54) CONSTRUCTION MACHINE

(71) Applicants: Kobe Steel, Ltd., Kobe (JP);
KOBELCO CONSTRUCTION MACHINERY CO., LTD., Hiroshima (JP)

(72) Inventors: Toshiaki Shimoda, Kobe (JP); Takashi Hiekata, Kobe (JP); Hiroshi Hashimoto, Kobe (JP)

(73) Assignees: Kobe Steel, Ltd., Kobe (JP);
KOBELCO CONSTRUCTION MACHINERY CO., LTD., Hiroshima (JP)

( * ) Notice: Subject to any disclaimer, the term of this patent is extended or adjusted under 35 U.S.C. 154(b) by 212 days.

(21) Appl. No.: 16/314,558

(22) PCT Filed: Jun. 29, 2017

(86) PCT No.: PCT/JP2017/023921
§ 371 (c)(1),
(2) Date: Dec. 31, 2018

(87) PCT Pub. No.: WO2018/020950
PCT Pub. Date: Feb. 1, 2018

(65) Prior Publication Data
US 2019/0360176 A1    Nov. 28, 2019

(30) Foreign Application Priority Data
Jul. 28, 2016  (JP) .................................. 2016-148423

(51) Int. Cl.
*E02F 9/26* (2006.01)
*E02F 9/24* (2006.01)
(Continued)

(52) U.S. Cl.
CPC ................ *E02F 9/261* (2013.01); *E02F 9/24* (2013.01); *G01C 3/14* (2013.01); *G01S 17/931* (2020.01);
(Continued)

(58) Field of Classification Search
CPC . E02F 9/261; E02F 9/24; E02F 9/2033; E02F 3/32; G01S 17/931; G01C 3/14; B60Q 5/006; G01B 21/00; G01B 11/00
See application file for complete search history.

(56) References Cited

U.S. PATENT DOCUMENTS

2009/0066968 A1   3/2009   Ikeda et al.
2011/0004379 A1   1/2011   Murota
(Continued)

FOREIGN PATENT DOCUMENTS

CN   1970894 A   5/2007
CN   101952520 A   1/2011
(Continued)

OTHER PUBLICATIONS

Extended European Office Action dated Jun. 3, 2019 European Patent Application No. 17833959.4, citing document AO therein, 5 pages.
(Continued)

*Primary Examiner* — Michael J Zanelli
(74) *Attorney, Agent, or Firm* — Oblon, McClelland, Maier & Neustadt, L.L.P.

(57) ABSTRACT

There is provided a construction machine that can detect a positional displacement of a detection unit, the machine including a body, a plurality of distance sensors, a position information acquisition unit, and a positional displacement detection unit. The distance sensors are disposed so that detection areas of the distance sensors partially overlap. When a predetermined target is placed in an overlapping (Continued)

detection area, the positional displacement detection unit compares position information of the target that is acquired from distance image data of one distance sensor by the position information acquisition unit to position information of the target that is acquired from distance image data of the other distance sensor by the position information acquisition unit to detect a positional displacement of at least one of the one distance sensor and the other distance sensor with respect to the body.

11 Claims, 10 Drawing Sheets

(51) Int. Cl.
  $G01C\ 3/14$ (2006.01)
  $G01S\ 17/931$ (2020.01)
  $B60Q\ 5/00$ (2006.01)
  $E02F\ 3/32$ (2006.01)
  $E02F\ 9/20$ (2006.01)

(52) U.S. Cl.
  CPC .............. $B60Q\ 5/006$ (2013.01); $E02F\ 3/32$ (2013.01); $E02F\ 9/2033$ (2013.01)

(56) References Cited

U.S. PATENT DOCUMENTS

| | | | |
|---|---|---|---|
| 2012/0327261 A1* | 12/2012 | Tafazoli Bilandi | E02F 9/262 348/222.1 |
| 2014/0303776 A1 | 10/2014 | Zhuan et al. | |
| 2014/0362220 A1 | 12/2014 | Izumikawa et al. | |
| 2016/0006947 A1* | 1/2016 | Kowatari | B60R 1/00 348/148 |
| 2017/0284071 A1* | 10/2017 | Yamaguchi | B60R 11/04 |

FOREIGN PATENT DOCUMENTS

| | | |
|---|---|---|
| CN | 104101312 A | 10/2014 |
| JP | 2001-64992 A | 3/2001 |
| JP | 2008-163719 A | 7/2008 |
| JP | 2008-165689 A | 7/2008 |
| JP | 2009-53136 A | 3/2009 |
| JP | 2011-27707 A | 2/2011 |
| JP | 2011-85849 A | 4/2011 |
| JP | 2012-225111 A | 11/2012 |
| JP | 2014-186551 A | 10/2014 |
| JP | 2014-215039 A | 11/2014 |

OTHER PUBLICATIONS

International Search Report dated Sep. 26, 2017, in PCT/JP2017/23921, filed Jun. 29, 2017.

* cited by examiner

CONSTRUCTION MACHINE

TECHNICAL FIELD

The present invention relates to a construction machine having a detection unit.

BACKGROUND ART

In some cases, users attach attachments other than those assumed by manufacturers of construction machines to construction machines. In construction machines such as demolition machines, demolished parts of buildings are sometimes held by attachments. In those cases, attachments, demolished parts of buildings, and the like are regarded as interference targets and may interfere with cabs of construction machines. Consequently, there is a need to prevent such interference in advance. As a sensor (detection unit) is mounted on the main body of the construction machine to detect the distance between the cab and the interference target, it is possible to prevent the interference target from interfering with the cab.

Patent Literature 1 discloses a technique of determining using a laser range finder whether an operator is present in an operating range of an operating machine when a wide range camera detects the color of a safety vest worn by the operator. Patent Literature 2 discloses a technique of detecting an obstacle based on stereo images acquired by a first stereo camera and a second stereo camera which are mounted on a top front of a cab of a hydraulic excavator at a predetermined interval therebetween. Patent Literature 3 discloses a technique in which a stereo camera mounted on a body of a construction machine detects surrounding features to prevent the construction machine from rolling over and sliding.

CITATION LIST

Patent Literature

Patent Literature 1: JP 2012-225111 A
Patent Literature 2: JP 2014-215039 A
Patent Literature 3: JP 2001-64992 A

SUMMARY OF INVENTION

In the techniques described in Patent Literatures 1 to 3, the position of a sensor may be displaced according to use of a construction machine (positional displacement). In particular, when the position of the sensor is displaced from that at the time of shipment from the factory by vibrations of the construction machine and external force applied to the body of the construction machine, the sensor cannot accurately recognize the surrounding environment of the construction machine.

An object of the present invention is to provide a construction machine that can detect a positional displacement of a detection unit.

A construction machine according to an aspect of the present invention includes a body, a plurality of detection units that are disposed on the body and detect environment data indicating information about a surrounding environment of the body, the plurality of detection units being disposed so as to allow detection areas of adjacent detection units among the plurality of detection units to partially overlap, a position information acquisition unit that acquires position information of a target placed in the detection area from the environment data detected by each of the detection units, and a positional displacement detection unit, when a predetermined target is placed in an overlapping detection area where the detection area of one detection unit among the plurality of detection units overlaps the detection area of another detection unit adjacent to the one detection unit, compares the position information of the target that is acquired from the environment data of the one detection unit by the position information acquisition unit to the position information of the target that is acquired from the environment data of the other detection unit by the position information acquisition unit to detect a positional displacement of at least one of the one detection unit and the other detection unit with respect to the body.

DESCRIPTION OF EMBODIMENTS

Figure 1:
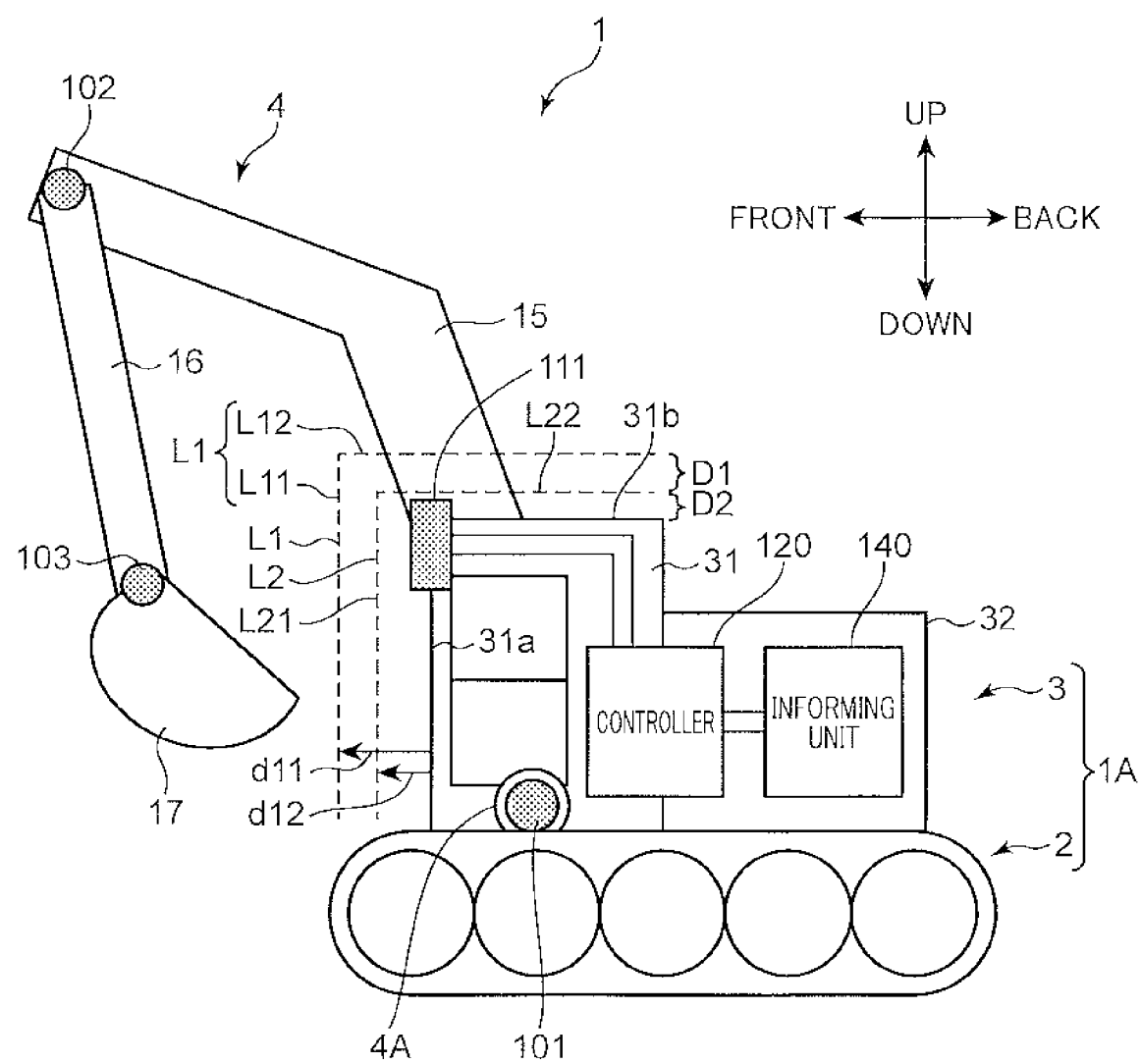
FIG. 1 is a schematic side view of a construction machine according to an embodiment of the present invention.

Embodiments of the present invention will be described below with reference to the drawings. FIG. 1 is a schematic side view of a construction machine 1 according to an embodiment of the present invention. Hereinafter, directions such as front, back, left, right, up, and down are described while the direction as viewed from a cab 31 is determined as a reference. In addition, the front and back are collectively referred to as a front-back direction, and the up and down are collectively referred to as a vertical direction. Moreover, the left and right are collectively referred to as a right-left direction.

The construction machine 1 includes a body 1A. The body 1A includes a lower travelling body 2 of a crawler type and an upper slewing body 3 that is disposed on the lower travelling body 2 so as to be slewable about an axis 3A (FIG. 5) extending in a vertical direction. The construction machine 1 also includes an operation attachment 4 that is attached to the upper slewing body 3 and whose posture is changeable. The upper slewing body 3 includes the cab 31 and an upper main body 32.

The operation attachment 4 is disposed on the right side of the cab 31, for example, so as to be adjacent to the cab 31, and is attached to the upper slewing body 3 so as to be derrickable with respect to the upper slewing body 3. The operation attachment 4 includes a boom 15, an arm 16 that is swingably attached to a distal end part of the boom 15, and a bucket 17 that is swingably attached to a distal end part of the arm 16 (a distal end side of the boom 15). The bucket 17 can hold a predetermined material to be held. Each of the boom 15, the arm 16, and the bucket 17 can change its posture by rotating about a predetermined shaft center extending in a horizontal direction. In particular, the boom 15 is rotatable about a shaft center 4A with respect to the upper slewing body 3. In addition to the bucket, a crusher, a demolition machine, and the like can be used as the operation attachment 4.

The upper slewing body 3 is formed in a box shape and includes the cab 31 where an operator sits. In the cab 31, a surface on the front is defined as a front surface 31*a* and an upward surface is defined as a top surface 31*b* (FIG. 1).

In front of the cab 31, an alarm area D1 and an automatic regulation area D2 are set in this order from the front. When an interference target enters the alarm area D1, it is informed to an operator that the interference target is approaching the cab 31 and the operator is in danger, and an operation of the operation attachment 4 is restricted. When the interference target enters the automatic regulation area D2, the operation of the operation attachment 4 is automatically stopped or restricted.

The alarm area D1 is defined by a boundary surface L1 and a boundary surface L2. The boundary surface L1 is constituted by a boundary surface L11 that faces the front surface 31*a* and a boundary surface L12 that faces the top surface 31*b*. The boundary surface L11 is set at a position spaced frontward from the front surface 31*a* by a distance d11 so as to be parallel to the front surface 31*a*. The boundary surface L12 is set at a position spaced upward from the top surface 31*b* by the distance d11 so as to be parallel to the top surface 31*b*.

The automatic regulation area D2 is defined by the boundary surface L2, the front surface 31*a*, and the top surface 31*b*. The boundary surface L2 is constituted by a boundary surface L21 that faces the front surface 31*a* and a boundary surface L22 that faces the top surface 31*b*. The boundary surface L21 is set at a position spaced frontward from the front surface 31*a* by a distance d12 (<d11) so as to be parallel to the front surface 31*a*. The boundary surface L22 is set at a position spaced upward from the top surface 31*b* by the distance d12.

Bottom ends of the alarm area D1 and the automatic regulation area D2 are placed in front of a lower part of the cab 31, for example. The right-left width of the alarm area D1 and the automatic regulation area D2 are set to the right-left width of the front surface 31*a* or to a width obtained by adding some margin to the right-left width of the front surface 31*a*, for example. These widths are merely examples, and the bottom ends and right-left width of the alarm area D1 and the automatic regulation area D2 may not be specified. Moreover, the alarm area D1 and the automatic regulation area D2 may be provided only in front of the front surface 31*a* and may not provided above the top surface 31*b*. The three-dimensional absolute coordinate system in which the alarm area D1 and the automatic regulation area D2 are set is defined as the three-dimensional coordinate system of the construction machine 1.

A first distance sensor 111 is placed at a predetermined position (an upper end in this case) on the front surface 31*a* of the cab 31. The first distance sensor 111 has a predetermined field of view (detection area) and acquires distance image data indicating a distance distribution of the surrounding environment of the upper slewing body 3 (in front of the upper slewing body 3 in this case). Specifically, the first distance sensor 111 is disposed on the front surface 31*a* such that a measurement range covers at least the entire boundary surface L21. Consequently, the first distance sensor 111 has no blind spots in the alarm area D1 opposing the front surface 31*a*, and thus the construction machine 1 can issue an alarm to an operator before an interference target enters the automatic regulation area D2.

The construction machine 1 also includes a first angle sensor 101, a second angle sensor 102, and a third angle sensor 103. The first angle sensor 101 is placed at a rotation support (the shaft center 4A) of the boom 15 and measures a rotation angle around the shaft center of the boom 15. The second angle sensor 102 is placed at a rotation support of the arm 16 and measures a rotation angle around the shaft center of the arm 16. The third angle sensor 103 is placed at a rotation support of the bucket 17 and measures a rotation angle around the shaft center of the bucket 17.

The upper slewing body 3 includes a controller 120 that is electrically connected to a plurality of distance sensors including the first distance sensor 111 and controls the entire construction machine 1. The cab 31 includes an informing unit 140 that informs an operator of a state of the construction machine 1 or the like under control of the controller 120.

Figure 2:
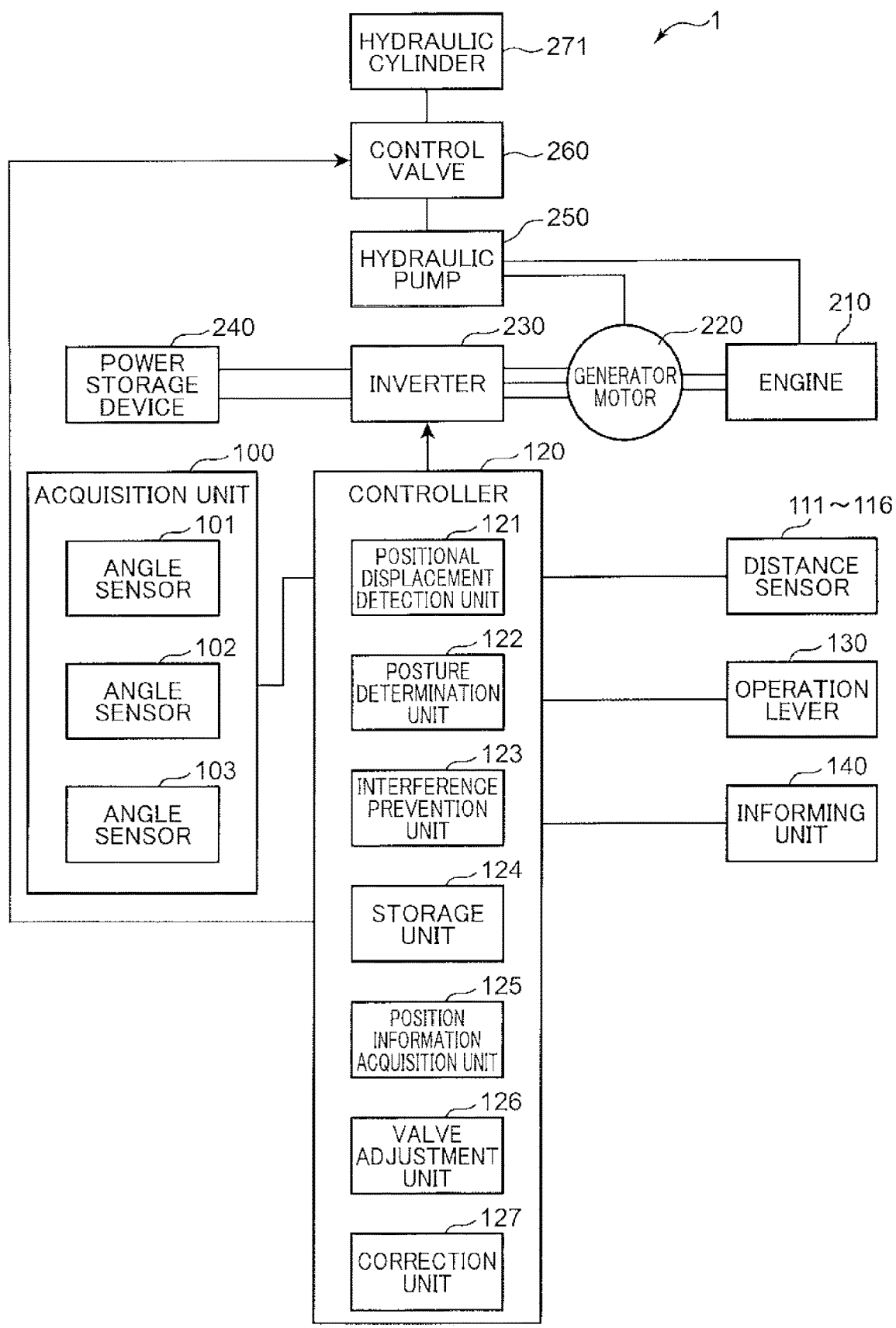
FIG. 2 is a block diagram illustrating an example of a system configuration of the construction machine illustrated in FIG. 1.

FIG. 2 is a block diagram illustrating an example of a system configuration of the construction machine 1 illustrated in FIG. 1. The construction machine 1 includes an engine 210, a generator motor 220 and a hydraulic pump 250 that are coupled to an output shaft of the engine 210, a control valve 260 that controls supply and discharge of hydraulic oil from the hydraulic pump 250 to a hydraulic cylinder 271, a power storage device 240 that can charge electric power generated by the generator motor 220, and an inverter 230 that performs electric power conversion between the power storage device 240 and the generator motor 220.

The hydraulic pump 250 is operated by the power of the engine 210 to eject hydraulic oil. The hydraulic oil ejected from the hydraulic pump 250 is guided to the hydraulic cylinder 271 while its flow rate is controlled by the control valve 260. The control valve 260 includes a pilot valve and a proportional valve. The pilot valve drives a predetermined valve body using a difference in pressure of hydraulic oil to open or close an oil passage led to the hydraulic cylinder 271. The proportional valve adjusts the flow rate of hydraulic oil supplied to the hydraulic cylinder 271.

The controller 120 includes a valve adjustment unit 126 (FIG. 2) that sets an opening of the proportional valve included in the control valve 260 based on the operation amount of an operation lever 130.

The hydraulic cylinder 271 expands or contracts when receiving hydraulic oil. Examples of the hydraulic cylinder 271 include a boom cylinder that derricks the boom 15 with respect to the upper slewing body 3, an arm cylinder that causes the arm 16 to swing with respect to the boom 15, and a bucket cylinder that causes the bucket 17 to swing with respect to the arm 16. Each of these cylinders includes the control valve 260 described above and can be controlled independently when receiving a control signal from the controller 120.

The generator motor 220 includes a configuration as a generator that converts the power of the engine 210 into electric power and a configuration as a motor that converts the electric power stored in the power storage device 240 into power. While the generator motor 220 is constituted by, for example, a three-phase motor in the example of FIG. 2, this is merely an example and the generator motor 220 may be constituted by a single-phase motor.

The power storage device 240 is constituted by various secondary batteries including a lithium ion battery, a nickel-metal hydride battery, an electrical double-layer capacitor, and a lead battery, for example.

The inverter 230 controls switching between an operation as the generator of the generator motor 220 and an operation as the motor of the generator motor 220 under the control of the controller 120. The inverter 230 also controls current and torque applied to the generator motor 220 under the control of the controller 120. While the inverter 230 is constituted by, for example, a three-phase inverter in the example of FIG. 2, this is merely an example and the inverter 230 may be constituted by a single-phase inverter.

Figure 3:
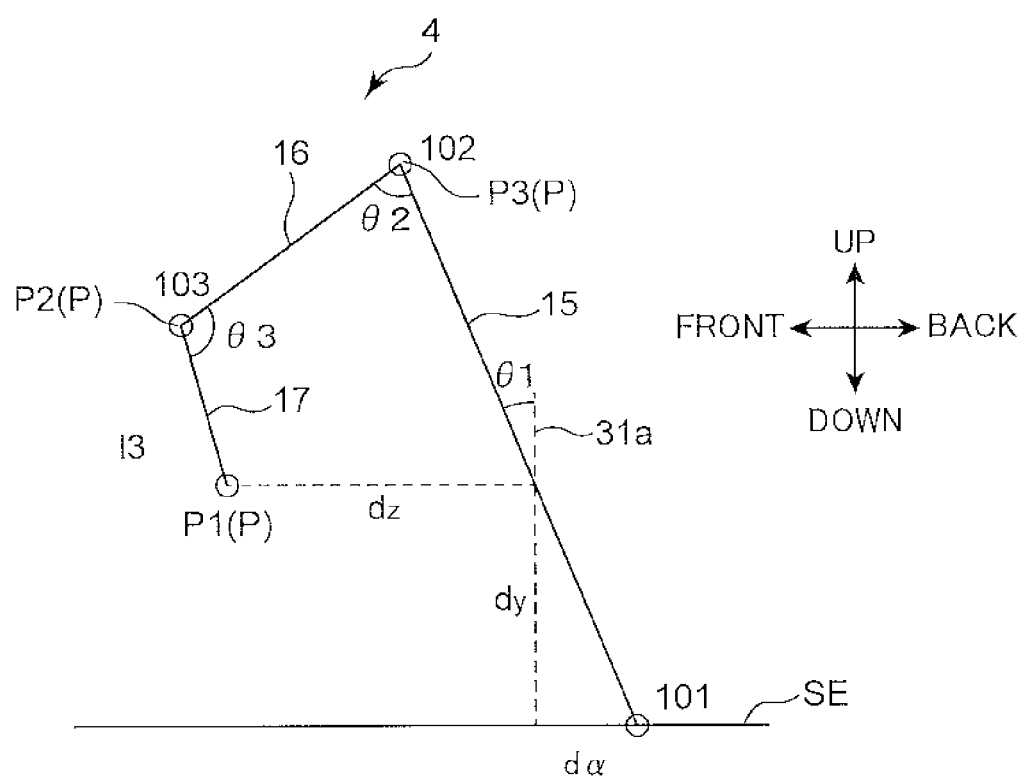
FIG. 3 is a simplified view illustrating an operation attachment of the construction machine according to the embodiment of the present invention.
Figure 4:
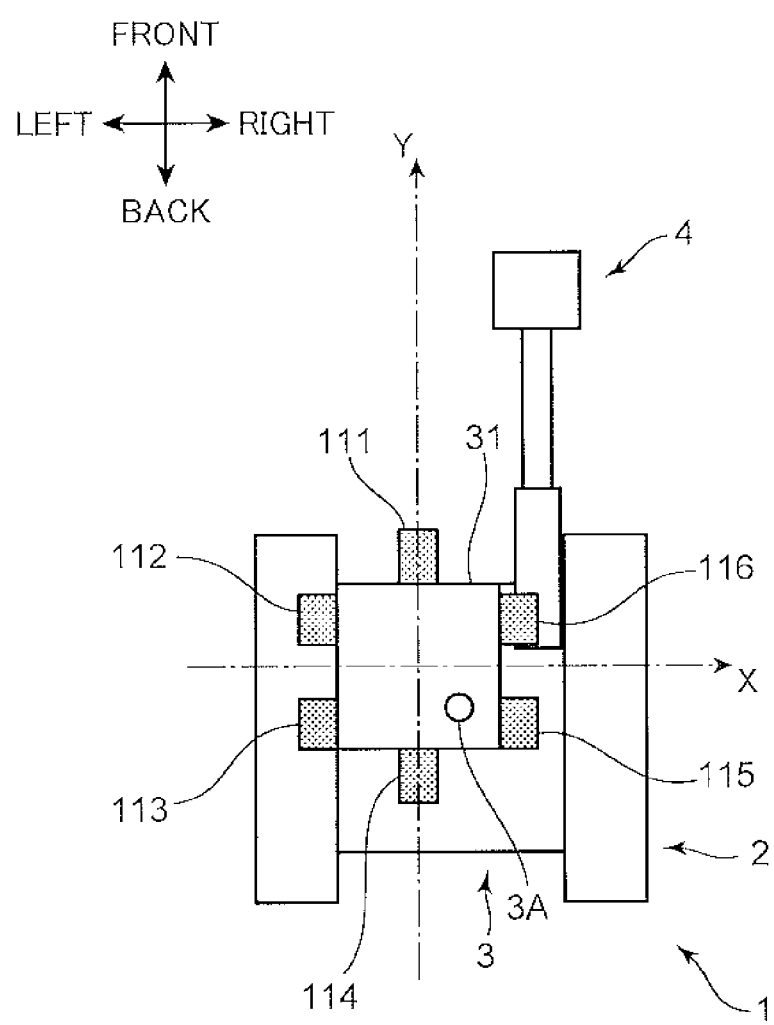
FIG. 4 is a schematic plan view of the construction machine according to the embodiment of the present invention.
Figure 5:
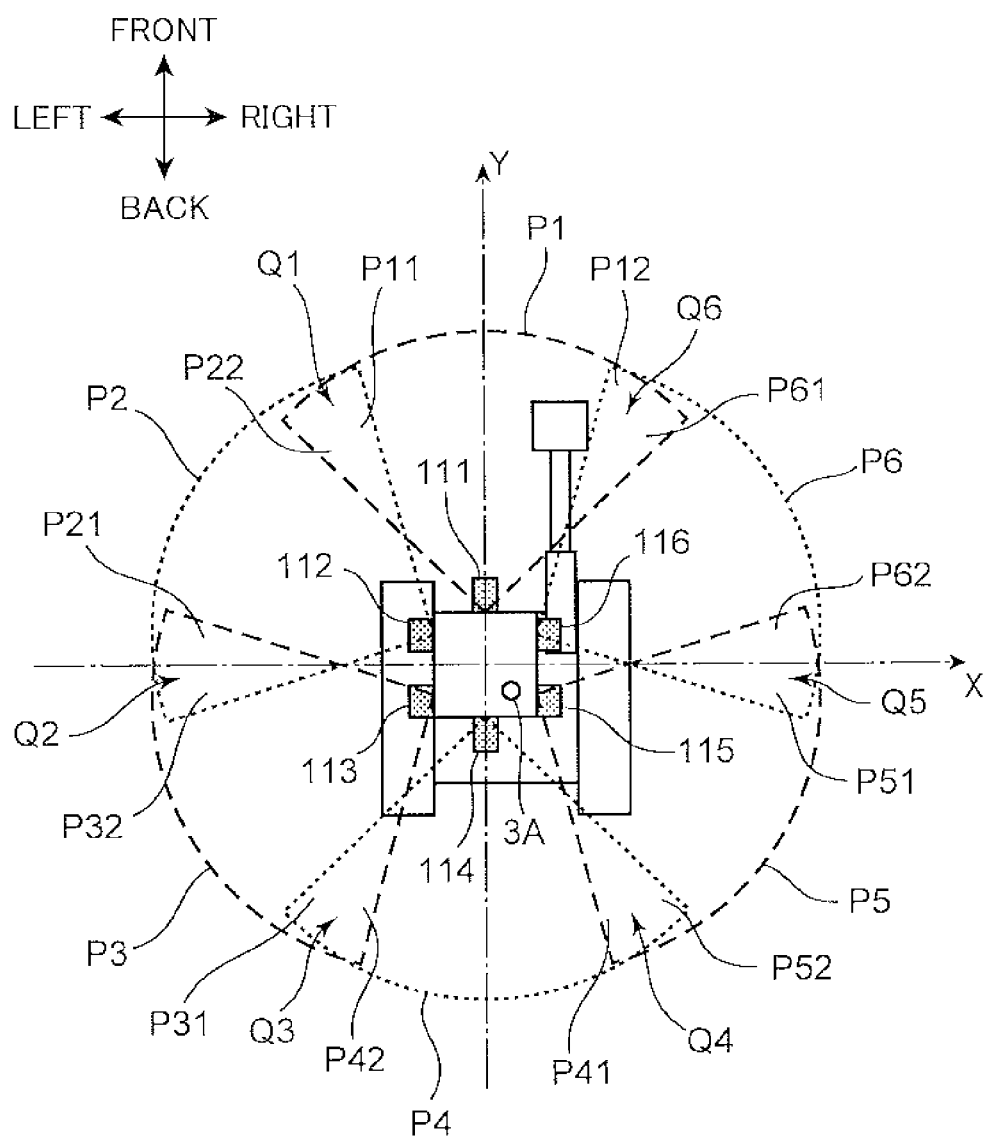
FIG. 5 is a plan view illustrating detection areas of a plurality of distance sensors in the construction machine according to the embodiment of the present invention.
Figure 6:
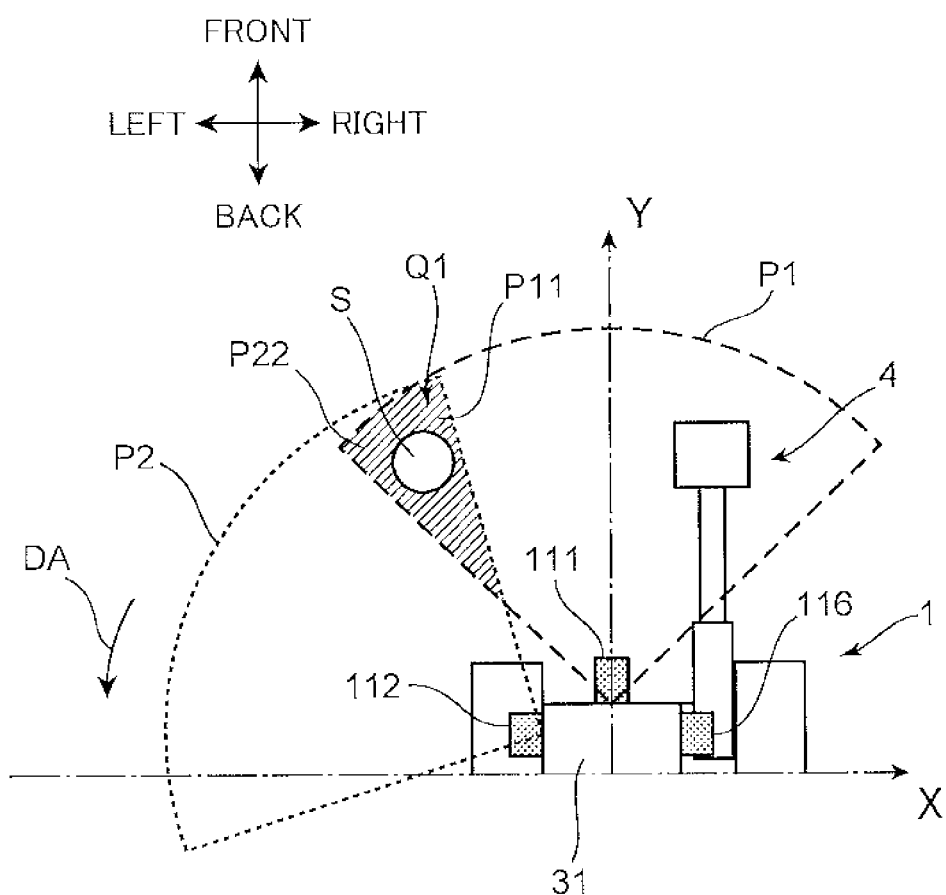
FIG. 6 is a partially enlarged plan view of the detection areas illustrated in FIG. 5.

FIG. 3 is a simplified view of the operation attachment 4. FIG. 4 is a schematic plan view of the construction machine 1 according to the present embodiment. FIG. 5 is a plan view illustrating detection areas of a plurality of distance sensors in the construction machine 1. FIG. 6 is a partially enlarged plan view of the detection areas illustrated in FIG. 5.

The construction machine 1 further includes an acquisition unit 100 (FIG. 2), the first to sixth distance sensors 111 to 116 (FIG. 4), the controller 120 and the informing unit 140, which are described above, and the operation lever 130 (FIG. 2) that receives an operation performed by an operator for the purpose of changing the posture of the operation attachment 4.

The acquisition unit 100 includes the first angle sensor 101, the second angle sensor 102, and the third angle sensor 103, which are described in FIG. 1, to acquire posture information indicating the posture of the operation attachment 4. The posture information corresponds to a rotation angle of the boom 15, a rotation angle of the arm 16, and a rotation angle of the attachment 17.

As illustrated in FIG. 4, the first distance sensor 111 is disposed on the front surface portion of the cab 31 so that the field of view of the first distance sensor 111 includes an area in front of the cab 31. The second distance sensor 112 is disposed on a front portion of a left side surface of the cab 31, and the third distance sensor 113 is disposed on a back portion of the left side surface of the cab 31. The fourth distance sensor 114 is disposed on a back surface portion of the cab 31. The fifth distance sensor 115 is disposed on a back portion of a right side surface of the cab 31, and the sixth distance sensor 116 is disposed on a front portion of the right side surface of the cab 31. The first to sixth distance sensors 111 to 116 have a predetermined field of view (detection area) and acquire (detect) distance image data (environment data) indicating a distance distribution (information) of the surrounding environment of the upper slewing body 3. That is to say, each of these distance sensors measures a distance from the sensor itself to an object around the cab 31 and outputs the distance on a pixel basis. The distance sensor such as the first distance sensor 111 to the sixth distance sensor 116 constitutes the detection unit of the present invention.

In the present embodiment, the distance sensor such as the first distance sensor 111 to the sixth distance sensor 116 is constituted by, for example, a depth sensor that includes a light source irradiating infrared light, a camera capable of receiving infrared light and visible light, and a processor processing image data captured by the camera. The distance sensor irradiates infrared light every fixed period of time (for example, every 30 fps), measures the time for the distance sensor to receive reflected light after irradiating infrared light on a pixel basis, and acquires distance image data indicating a distance distribution of the surrounding environment of the cab 31, for example.

In recent years, the depth sensor that irradiates infrared light has increased its practical applications as a distance measurement unit, and is utilized as an input interface for inputting gestures in games. As the construction machine 1 is used at night, the depth sensor using infrared light is useful for the construction machine 1. In the depth sensor irradiating infrared light, the system of measuring the time for the depth sensor to receive reflected light after irradiating infrared light, which is described above, is known as a ToF (Time of Flight) system. In addition, the depth sensor also employs a pattern irradiation system that measures a distance based on a reflected-light-receiving pattern when light of a certain pattern is irradiated. The depth sensor of the pattern irradiation system may also be used. As the construction machine 1 is commonly operated outdoors, a laser scanning ToF depth sensor that is resistant to interference with sunlight may be used. The depth sensor irradiating infrared light has high reliability and practical characteristics, and thus it is possible to achieve stable detection operations of the first distance sensor 111 to the sixth distance sensor 116.

While the depth sensor is used as the first distance sensor 111 to the sixth distance sensor 116 in the present embodiment, the present invention is not limited to that case. Each distance sensor may be constituted by a stereo camera that is relatively less expensive than the depth sensor. In this case, the distance sensor is constituted by a stereo camera and a processor that calculates a distribution of distances to an object using a plurality of pieces of image data captured by a plurality of cameras constituting the stereo camera, for example. The stereo sensor has low cost, high reliability, and practical characteristics, and thus it is possible to achieve stable detection operations of the first distance sensor 111 to the sixth distance sensor 116.

Referring to FIG. 5, the first distance sensor 111 to the sixth distance sensor 116 are disposed on the cab 31 of the upper slewing body 3 (FIG. 1) so that adjacent detection areas partially overlap. In addition, the first distance sensor 111 to the sixth distance sensor 116 are disposed along a rotation direction (slewing direction) of the upper slewing body 3 during a slewing operation. In FIG. 5, detection areas of the first distance sensor 111, the second distance sensor 112, the third distance sensor 113, the fourth distance sensor 114, the fifth distance sensor 115, and the sixth distance sensor 116 are illustrated as a first sensor detection area P1, a second sensor detection area P2, a third sensor detection area P3, a fourth sensor detection area P4, a fifth sensor detection area P5, and a sixth sensor detection area P6, respectively. These detection areas are formed in a fan shape having a viewing angle of approximately 100 degrees while the position of each sensor being the center, as viewed from the top. The viewing angle of the detection area of the sensor may be set according to purpose and function. As the distance sensors are disposed on the upper slewing body 3 as described above, if the upper slewing body 3 is slewed with respect to the lower travelling body 2, it is possible to always keep a first overlapping area Q1 to a sixth overlapping area Q6.

An end portion P11 of the first sensor detection area P1 overlaps an end portion P22 of the second sensor detection area P2, so that the first overlapping area Q1 (FIGS. 5 and 6) is formed. Similarly, an end portion P21 of the second sensor detection area P2 overlaps an end portion P32 of the third sensor detection area P3, so that the second overlapping area Q2 is formed. An end portion P31 of the third sensor detection area P3 overlaps an end portion P42 of the fourth sensor detection area P4, so that the third overlapping area Q3 is formed. An end portion P41 of the fourth sensor detection area P4 overlaps an end portion P52 of the fifth sensor detection area P5, so that the fourth overlapping area Q4 is formed. An end portion P51 of the fifth sensor detection area P5 overlaps an end portion P62 of the sixth sensor detection area P6, so that the fifth overlapping area Q5 is formed. Moreover, an end portion P61 of the sixth sensor detection area P6 overlaps an end portion P12 of the first sensor detection area P1, so that the sixth overlapping area Q6 is formed. The first sensor detection area P1 to the sixth sensor detection area P6 that are connected to each other via the first overlapping area Q1 to the sixth overlapping area Q6 are thus arranged so as to surround the rotation axis 3A (FIG. 5) of the upper slewing body 3 as viewed from the top and to cover a full 360 degrees. These first sensor detection area P1 to sixth sensor detection area P6 prevent blind spots around the construction machine 1.

Referring to FIG. 2, the operation lever 130 is operated by, for example, an operator to output a signal indicating an operation amount to the controller 120.

The controller 120 is configured by, for example, a processor such as a microcontroller and a storage device that stores programs and the like. The controller 120 includes a positional displacement detection unit 121, a posture determination unit 122, an interference prevention unit 123, a storage unit 124, a position information acquisition unit 125, a valve adjustment unit 126, and a correction unit 127. The positional displacement detection unit 121 to the correction unit 127 may be configured by a dedicated hardware circuit or may be achieved by a CPU executing programs.

The positional displacement detection unit 121 has a function of detecting positional displacements of the first distance sensor 111 to the sixth distance sensor 116 with respect to the cab 31 of the upper slewing body 3.

The posture determination unit 122 determines the posture of the operation attachment 4 based on outputs of the first angle sensor 101, the second angle sensor 102, and the third angle sensor 103. Posture information of the operation attachment 4 determined by the posture determination unit 122 is displayed on a display in the cab 31.

The interference prevention unit 123 detects an interference target that is the operation attachment 4 or a material to be held by the operation attachment 4 using distance image data acquired by the first distance sensor 111 to determine the risk of interference of the detected interference target with the cab 31. In addition, when the interference prevention unit 123 determines that there is a risk of interference, the interference prevention unit 123 at least informs an operator of the risk or restricts the operation of the construction machine 1.

The storage unit 124 stores various information for converting distance image data acquired by the first distance sensor 111 to the sixth distance sensor 116 into three-dimensional coordinates of the construction machine 1.

The position information acquisition unit 125 acquires position information (image data) of the operation attachment 4 relative to the first distance sensor 111 from the distance image data acquired by the first distance sensor 111. The position information acquisition unit 125 acquires position information of a target disposed in the detection areas from the distance image data acquired by the first distance sensor 111 to the sixth distance sensor 116. As illustrated in FIG. 6, the first sensor detection area P1 of the first distance sensor 111 includes a movable operation attachment 4. Consequently, the first distance sensor 111 is also used to prevent the interference with the cab 31 of the construction machine 1. Meanwhile, in addition to the first distance sensor 111, the second distance sensor 112 to the sixth distance sensor 116 are used to determine whether an operator or an object is present around the construction machine 1 or to check land features around the construction machine 1. With information acquired by these sensors, it is possible to safely perform a basic operation of the construction machine 1 and a slewing operation of the upper slewing body 3.

The boom 15, the arm 16, and the attachment 17 are indicated by straight lines for simplifying the explanation in FIG. 3. According to the example of FIG. 3, in the coordinate system of the construction machine 1, the front surface 31a is defined as a front-back origin, a reference plane SE is defined as a vertical origin, and the right-left center of the front surface 31a is defined as a right-left origin.

The lengths of the boom 15, the arm 16, and the attachment 17 are known. A front-back distance dα between the front surface 31a of the cab 31 and the angle sensor 101 is also known. Consequently, if a rotation angle θ1 of the boom 15 with respect to the front surface 31a, a rotation angle θ2 of the arm 16 with respect to the boom 15, and a rotation angle θ3 of the attachment 17 with respect to the arm 16 are determined, it is possible to calculate height dy and depth dz of a representative point P of the operation attachment 4 (for example, a distal end P1 of the attachment 17, a distal end P2 of the arm, or a distal end P3 of the boom) using a trigonometric function. The height dy indicates, for example, a vertical distance from the reference plane SE parallel to the front-back direction to the point P and the depth dz indicates, for example, a front-back distance from the front surface 31a to the point P.

Consequently, if the rotation angles θ1 to θ3 acquired by the acquisition unit 100 are determined, it is possible to identify the position of the point P in the three-dimensional coordinate system of the construction machine 1, that is, in an actual space. When the point P is determined, it is possible to determine where the boom 15, the arm 16, and the attachment 17 appear in the coordinate region of the distance image data measured by the first distance sensor 111, from the viewing angle and mounting position of the first distance sensor 111, and the angle of an optical axis. As a result, the position information acquisition unit 125 can acquire position information (image data) of the operation attachment 4 from the distance image data acquired by the first distance sensor 111.

In the present embodiment, the posture information acquisition unit 125 includes correspondence information that indicates in advance the coordinate region in distance image data where the operation attachment 4 is present according to the posture information acquired by the acquisition unit 100. The position information acquisition unit 125 then uses the correspondence information to determine the position information of the operation attachment 4 based on the position information measured by angle sensors in the acquisition unit 100.

The interference prevention unit 123 detects an interference target that is the operation attachment 4 or a material to be held by the operation attachment 4 using the position information determined by the position information acquisition unit 125 to determine the risk of interference of the detected interference target with the cab 31. The interference prevention unit 123 determines the risk of the interference of the interference target by determining whether the depth of the detected interference target enters the alarm area D1 or the automatic regulation area D2. Specifically, the interference prevention unit 123 may determine that the interference target is at the coordinate of the minimum depth in the distance image data and detect the depth at that coordinate as the depth of the interference target. The interference prevention unit 123 may convert the height and depth of the detected interference target from the three-dimensional coordinate system of the first distance sensor 111 to the three-dimensional coordinate system of the construction machine 1, and determine whether the converted height and depth enter the alarm area D1 or the automatic regulation area D2.

Alternatively, the interference prevention unit 123 may determine whether the interference target enters the alarm area D1 or the automatic regulation area D2 using only the depth. In this case, the interference prevention unit 123 may convert the minimum depth in the distance image data into the three-dimensional coordinate system of the construction machine 1. When the resultant depth is within a range of the distance d12 from the front surface 31a, the interference prevention unit 123 may determine that the depth enters the automatic regulation area D2. When the resultant depth is within a range of the distance d12 or longer or a range of the distance d11 from the front surface 31a, the interference prevention unit 123 may determine that the depth enters the alarm area D1.

In addition, when the interference prevention unit 123 determines that there is a risk of interference, the interference prevention unit 123 at least warns an operator of the risk or restricts the operation of the operation attachment 4. Specifically, when it is determined that the interference target is in the alarm area D1, the interference prevention unit 123 causes the informing unit 140 to issue a warning. As the way of warning, a buzzer may be rung, a warning lamp may be turned on or flickered, or a warning message may be displayed on a display panel. Alternatively, these methods may be employed in combination as the way of warning. When it is determined that the interference target is in the automatic regulation area D2, the interference prevention unit 123 decelerates or automatically stops the operation attachment 4 to restrict the operation of the operation attachment 4.

In this case, the interference prevention unit 123 may decelerate the operation attachment 4 by correcting the opening of the proportional valve in the control valve 260 that is set by the valve adjustment unit 126 based on the operation amount of the operation lever 130 in a direction of decelerating the operation attachment 4. In addition, the interference prevention unit 123 may increase the deceleration amount of the operation attachment 4 as the depth of the interference target approaches the cab 31. The informing unit 140 includes a buzzer, a display panel, and a warning lamp that are disposed in the cab 31, and warns an operator under control of the interference prevention unit 123.

The positions of the first distance sensor 111 to the sixth distance sensor 116 included in the cab 31 of the upper slewing body 3 are sometimes displaced by the use of the construction machine 1 (positional displacement). In particular, the position of each of the sensors is displaced from that at the time of shipment from the factory by vibrations of the construction machine 1 and external force applied to the body of the construction machine 1, the sensor cannot accurately recognize the surrounding environment of the construction machine 1. In order to solve such a problem, the positional displacement detection unit 121 detects a positional displacement of each sensor in the present embodiment.

Figure 7:
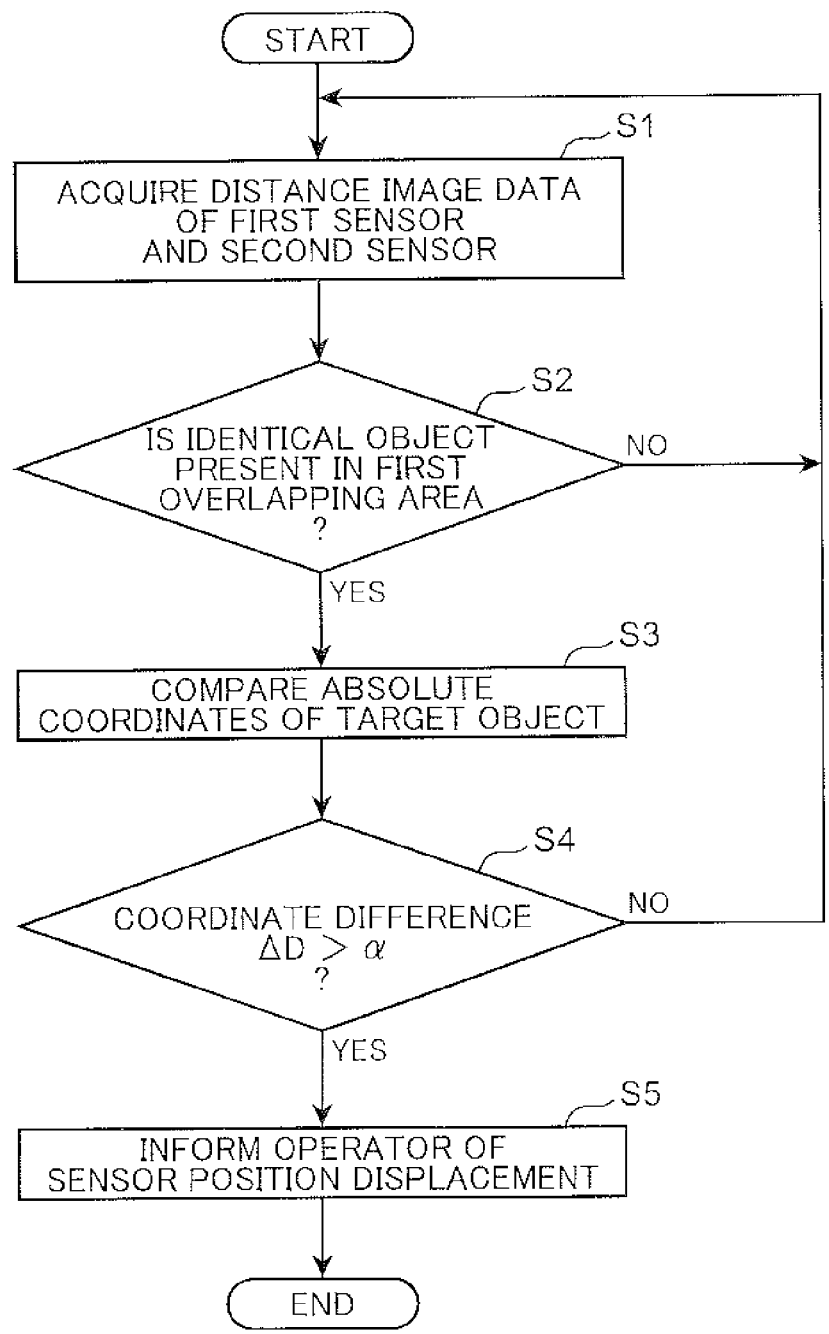
FIG. 7 is a flowchart of a positional displacement detection operation in the construction machine according to the embodiment of the present invention.

FIG. 7 is a flowchart of a positional displacement detection operation performed by the positional displacement detection unit 121 in the construction machine 1 according to the present embodiment. When the construction machine 1 is manufactured and shipped from the factory, three-dimensional absolute coordinates of the first distance sensor 111 to the sixth distance sensor 116 fixed on the cab 31 are stored in the storage unit 124. A process of detecting positional displacements of the first distance sensor 111 and the second distance sensor 112 is described below as an example of a process of detecting positional displacements of a plurality of sensors. When the construction machine 1 starts to be used at a usage site, the positional displacement detection unit 121 controls the first distance sensor 111 and the second distance sensor 112 to acquire distance image data (step S1 in FIG. 7). The first distance sensor 111 to the sixth distance sensor 116 always acquire distance image data and store the distance image data in the storage unit 124 as needed for the purpose of determining whether an operator or an object is present around the construction machine 1. For this reason, the data stored in the storage unit 124 may be used in the positional displacement detection process.

The positional displacement detection unit 121 controls the position information acquisition unit 125 to determine whether an identical object is present in the first overlapping area Q1 (FIG. 6) in the distance image data of the first distance sensor 111 and the second distance sensor 112 (step S2). In this case, the position information acquisition unit 125 converts each of the distance image data into a distribution of three-dimensional absolute coordinates to acquire position information of the target in the first sensor detection area P1 and in the second sensor detection area P2 (FIG. 6). The positional displacement detection unit 121 can thus determine whether the identical target is present based on the similarity of the shape of the target included in the respective pieces of data or the consistency of the coordinates.

When the identical object S (FIG. 6) is present in the first overlapping area Q1 (YES at step S2), the positional displacement detection unit 121 compares position information of the object S acquired from the distance image data of the first distance sensor 111 by the position information acquisition unit 125 to position information of the object S acquired from the distance image data of the second distance sensor 112 by the position information acquisition unit 125 (step S3). The position information acquired by the position information acquisition unit 125 includes not only the three-dimensional absolute coordinate (X, Y, Z) of the object S but also a distance from each sensor to the object S. As the position information includes the three-dimensional absolute coordinate, it is possible to detect a positional displacement of a distance sensor with high precision.

Next, the positional displacement detection unit 121 calculates a coordinate difference ΔD in coordinates of the object S included in the respective pieces of data based on the absolute coordinates of the first distance sensor 111 and the second distance sensor 112. The coordinate difference ΔD may be the largest difference among the X, Y, and Z coordinate differences of the object S. Alternatively, the coordinate difference ΔD may be the distance between predetermined representative positions of the object S. The positional displacement detection unit 121 compares the calculated coordinate difference ΔD to a threshold α that is set and stored in the storage unit 124 in advance (step S4). When "coordinate difference D>α" (YES at step S4), the positional displacement detection unit 121 determines that the position of at least one of the first distance sensor 111 and the second distance sensor 112 with respect to the cab 31 is displaced from that at the time of shipment from the factory. The positional displacement detection unit 121 thus causes the informing unit 140 included in the cab 31 (FIGS. 1 and 2) to inform an operator of sensor position displacement information (step S5).

When the identical object is not present in the first overlapping area Q1 at step S2 in FIG. 7 (NO at step S2) or when "coordinate difference ΔD≤α" at step S4 (NO at step S4), the construction machine 1 continues to operate, the distance image data of the first distance sensor 111 and the second distance sensor 112 is acquired, and steps S1 to S4 are repeated.

As described above, the first sensor detection area P1 of the first distance sensor 111 and the second sensor detection area P2 of the second distance sensor 112 that are adjacent to each other partially overlap, so that the first overlapping area Q1 is formed in the present embodiment. When the predetermined object S is disposed in the first overlapping area Q1, position information of the identical target from the distance image data acquired by the first distance sensor 111 is compared to position information of the identical target from the distance image data acquired by the second distance sensor 112, so that a positional displacement of the distance sensor can be detected. As described above, the first distance sensor 111 is used for preventing interference of the construction machine 1, and thus an operator can perform an operation of periodically checking a positional displacement on the first distance sensor 111 among other sensors. In this case, as the position of the first distance sensor 111 is checked, when "coordinate difference ΔD>α" at step S4 in FIG. 7, the positional displacement detection unit 121 may determine that a positional displacement is generated in the second distance sensor 112. In addition, as the positional displacement detection process illustrated in FIG. 7 is performed in the adjacent sensors illustrated in FIG. 5, it is possible to successively detect a positional displacement of each sensor.

When a positional displacement is detected in one of the adjacent distance sensors, the correction unit 127 (data correction unit) (FIG. 2) in the controller 120 may correct the distance image data of one of the first distance sensor 111 and the second distance sensor 112 based on the difference (ΔD) between the position information acquired from the distance image data of the first distance sensor 111 by the position information acquisition unit 125 and the position information acquired from the distance image data of the second distance sensor 112 by the position information acquisition unit 125. In this case, the distance sensors can continue to be used temporarily before an operator corrects a positional displacement of a distance sensor.

Figure 8:
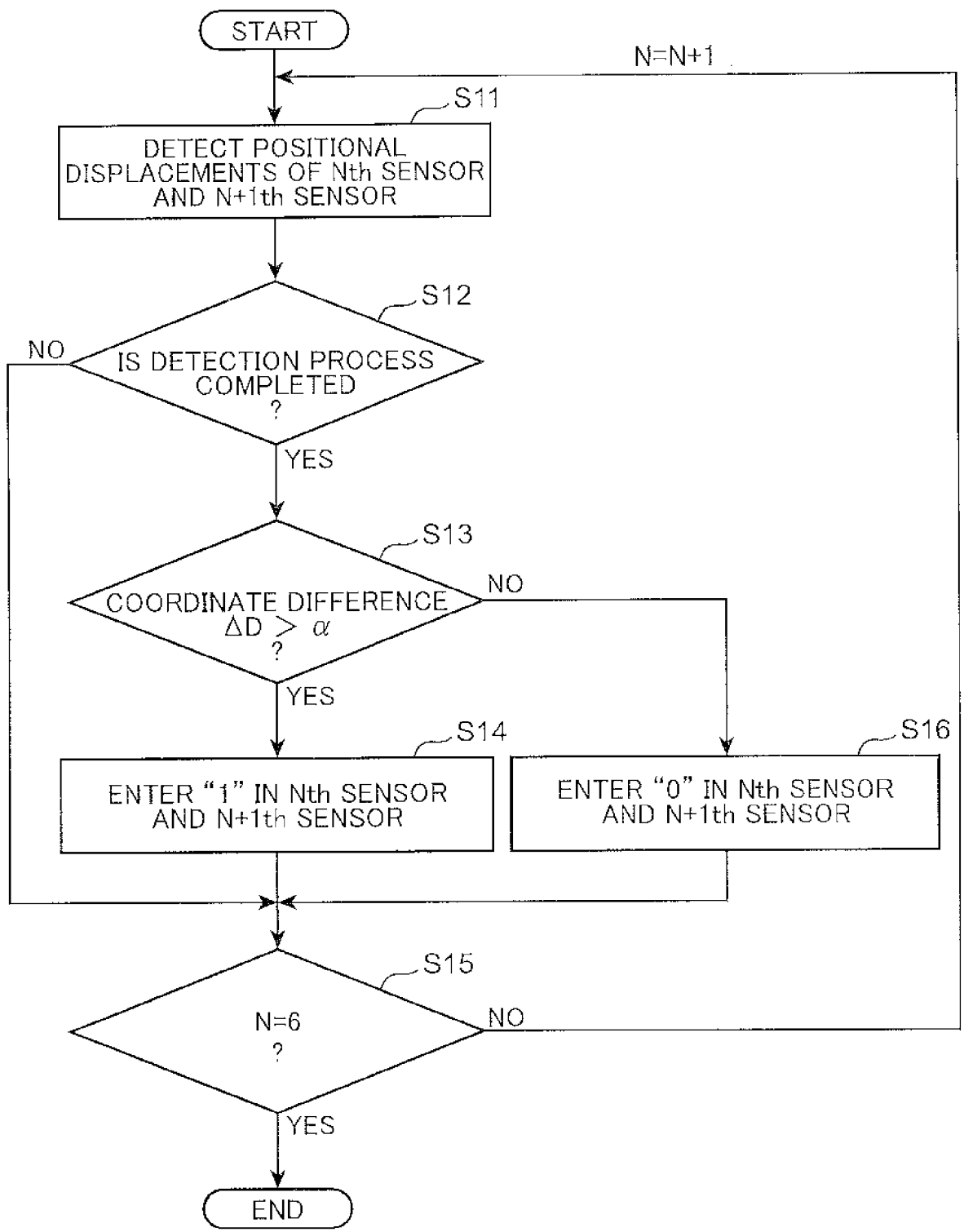
FIG. 8 is a flowchart of a positional displacement detection operation in a construction machine according to another embodiment of the present invention.

In the positional displacement detection process described above, when the positions of the first distance sensor 111 and the second distance sensor 112 are displaced in the same direction, it is difficult to detect such a case. Such a positional displacement is hardly generated in the first distance sensor 111 to the sixth distance sensor 116 disposed around the cab 31. To perform the operation of the construction machine 1 safely and efficiently, however, it is possible to perform a process of detecting positional displacements of a plurality of sensors in a second embodiment of the present invention. FIG. 8 is a flowchart of a positional displacement detection operation in a construction machine according to the second embodiment of the present invention. The present embodiment is different from the first embodiment in a flow of the positional displacement detection process performed by the positional displacement detection unit 121, and thus this difference will be described mainly and descriptions of matters that are common to these embodiments will be omitted.

Referring to FIG. 8, when the positional displacement detection process according to the present embodiment starts, the positional displacement detection unit 121 detects positional displacements of an Nth sensor and an N+1th sensor (step S11). N is an integer and the following process (steps S11 to S15) is repeated for N=1 to 6. The positional displacement detection process at step S11 is identical to the flow of steps S1 to S3 illustrated in FIG. 7.

That is, in the initial positional displacement detection process, the positional displacement detection unit 121 detects positional displacements of the first distance sensor 111 and the second distance sensor 112. As described above, when the object S is recognized in the first overlapping area Q1 where the first sensor detection area P1 (FIG. 6) overlaps the second sensor detection area P2 and the positional displacement detection process is completed in the first distance sensor 111 and the second distance sensor 112 (YES at step S12), the positional displacement detection unit 121 compares the coordinate difference ΔD to the threshold α (step S13).

Table 1 is an example of a determination table that is stored in the storage unit 124 by the positional displacement detection unit 121.

TABLE 1

|  | First sensor | Second sensor | Third sensor | Fourth sensor | Fifth sensor | Sixth sensor |
| --- | --- | --- | --- | --- | --- | --- |
| First to second | 0 | 0 |  |  |  |  |
| Second to third |  | 0 | 0 |  |  |  |
| Third to fourth |  |  | 1 | 1 |  |  |
| Fourth to fifth |  |  |  | 1 | 1 |  |
| Fifth to sixth |  |  |  |  | 0 | 0 |
| Sixth to first | 0 |  |  |  |  | 0 |
| Determination | 0 | 0 | 1 | 2 | 1 | 0 |

When "coordinate difference ΔD>α" at step S13 (YES at step S13), the positional displacement detection unit 121 enters "1" in columns of "first sensor" and "second sensor" in a row of determination of "first to second sensors" in the determination table (step S14). Meanwhile, when "coordinate difference ΔD≤α" (NO at step S13), the positional displacement detection unit 121 enters "0" in the columns of "first sensor" and "second sensor" in the row of determination of "first to second" in the determination table (step S16). In Table 1 described above, "0" is entered in the columns of "first sensor" and "second sensor" in the row of determination of "first to second".

When the determination operation is completed in the first distance sensor 111 and the second distance sensor 112, steps S11 to S16 are repeated until N=6. In the process of steps S11 to S16, when N=6, it is assumed that N+1=1. That is, when N=6 in the process of steps S11 to S16, the sixth distance sensor 116 is compared to the first distance sensor 111. When the positional displacement detection process is not completed normally in the Nth sensor and the N+1th sensor at step S12 (NO at step S12), the process proceeds to step S15 and the positional displacement detection unit 121 first compares other sensors. In this case, sensors in which determination results are not entered in the determination table of Table 1 may be compared later.

When all the information in the determination table of Table 1 is entered during the operation of the construction machine 1, the positional displacement detection unit 121 determines positional displacements of the first distance sensor 111 to the sixth distance sensor 116. In table 1, in detecting positional displacements of the third distance sensor 113 and the fourth distance sensor 114, "coordinate difference $\Delta D > \alpha$" is satisfied and thus positional displacements are detected. Similarly, in detecting positional displacements of the fourth distance sensor 114 and the fifth distance sensor 115, "coordinate difference $\Delta D > \alpha$" is satisfied and thus positional displacements are detected. In this case, accumulative information "2" is entered in the column of determination of the fourth distance sensor 114. Consequently, the positional displacement detection unit 121 determines that a positional displacement is generated in the fourth distance sensor 114 and informs an operator of the positional displacement information through the informing unit 140 in the cab 31 or the like. When the positional displacement of the fourth distance sensor 114 is corrected by the operator and a predetermined reset process is performed, all the information in the determination table of Table 1 is also reset. According to Table 1, in detecting positional displacements of the second distance sensor 112 and the third distance sensor 113 and positional displacements of the fifth distance sensor 115 and the sixth distance sensor 116, "coordinate difference $\Delta D \leq \alpha$" is satisfied and thus information "0" is entered in the columns of the sensors. Accumulative information "1" in the columns of determination of the third distance sensor 113 and the fifth distance sensor 115 is probably caused by the positional displacement of the fourth distance sensor 114. Consequently, information "1" may also be reset. According to the present embodiment, it is possible to detect a final positional displacement while the possibility of a positional displacement of each distance sensor being accumulated based on a result of comparison between adjacent distance sensors.

In detecting a positional displacement between the sensors, different objects may be placed in the first overlapping area Q1 to the sixth overlapping area Q6. If the upper slewing body 3 is slewed while a predetermined target (object S) being placed in the first overlapping area Q1, the target is placed in the second overlapping area Q2 and then the next positional displacement detection process may be performed. It is thus desirable to additionally dispose an angle sensor (not shown) on the rotating shaft of the upper slewing body 3. By detecting an output of the angle sensor, the controller 120 can control the rotation amount of the upper slewing body 3.

Also in the present embodiment, the correction unit 127 may correct distance image data of a predetermined sensor based on a positional displacement detection result of the positional displacement detection unit 121. In FIG. 5, when it is detected that a positional displacement is generated in the second distance sensor 112, the correct coordinate of a target in the first overlapping area Q1 can be acquired from a detection result of the first distance sensor 111, and the correct coordinate of a target in the second overlapping area Q2 can be acquired from a detection result of the third distance sensor 113. The second distance sensor 112 indicates the wrong coordinates of the objects in the first overlapping area Q1 and in the second overlapping area Q2. By using all or some of the coordinates indicated by the first distance sensor 111 and the third distance sensor 113, the distance image data of the second distance sensor 112 can be corrected. In this case, a predetermined positional displacement is generated in the second distance sensor 112 but the second distance sensor 112 can continue to be used as a safety device that detects a surrounding target. The second sensor detection area P2 may be partially missed due to the positional displacement of the second distance sensor 112, and thus it is desirable to ask an operator to perform maintenance by an alarm or the like.

The process of the second embodiment is described by using the first distance sensor 111, the second distance sensor 112, and the third distance sensor 113 that is adjacent to the second distance sensor 112 on the opposite side to the side at which the first distance sensor 111 is disposed as an example. When a predetermined first target is placed in the first overlapping area Q1 where the first sensor detection area P1 of the first distance sensor 111 overlaps the second sensor detection area P2 of the second distance sensor 112, the positional displacement detection unit 121 compares first position information of the first target that is acquired from the distance image data of the first distance sensor 111 by the position information acquisition unit 125 to second position information of the first target that is acquired from the distance image data of the second distance sensor 112 by the position information acquisition unit 125. In addition, when a predetermined second target is placed in the second overlapping area Q2 where the second sensor detection area P2 of the second distance sensor 112 overlaps the third sensor detection area P3 of the third distance sensor 113, the positional displacement detection unit 121 compares third position information of the second target that is acquired from the distance image data of the second distance sensor 112 by the position information acquisition unit 125 to fourth position information of the second target that is acquired from the distance image data of the third distance sensor 113 by the position information acquisition unit 125. The positional displacement detection unit 121 thus detects a positional displacement of the second distance sensor 112 based on a result of comparison between the first position information and the second position information and a result of comparison between the third position information and the fourth position information.

When the difference $\Delta D$ in position information of two adjacent distance sensors exceeds the predetermined threshold $\alpha$, the positional displacement detection unit 121 applies predetermined possibly-positional-displacement information (information "1" entered in Table 1) to these two distance sensors. When the difference $\Delta D$ in position information is less than or equal to the threshold $\alpha$, the positional displacement detection unit 121 applies predetermined no-positional-displacement information (information "0" entered in Table 1) to these two distance sensors. The positional displacement detection unit 121 then detects a positional displacement of each distance sensor based on the number of pieces of the possibly-positional-displacement information "1" of each distance sensor.

In the embodiments described above, the interference prevention unit 123 performs an operation of preventing interference of the operation attachment 4 and a material to be held by the operation attachment 4 with the cab 31 based on the distance image data acquired by the first distance sensor 111. Consequently, if a positional displacement is generated in the first distance sensor 111, wrong recognition occurs in the first distance sensor 111 and thus the interference prevention operation is not performed accurately. As the process of detecting the positional displacement of the first distance sensor 111 is performed as described above, the interference prevention unit 123 can perform the interference prevention operation reliably.

The construction machine 1 according to the embodiment of the present invention has been described above. With such a configuration, it is possible to detect positional displacements of a plurality of distance sensors disposed on the upper slewing body 3 of the construction machine 1. It is thus possible to stably acquire surrounding information of the construction machine 1 and to safely and efficiently perform an operation of the construction machine 1. The detection areas P1 to P6 of the distance sensors are arranged around the upper slewing body 3 and thus in particular, the operation of the construction machine 1 can be safely performed. As illustrated in FIG. 5, a plurality of overlapping detection areas are arranged along the slewing direction of the upper slewing body 3 at intervals. When all the detection areas surround 360 degrees around the axis of the upper slewing body 3, each distance sensor has two overlapping detection areas. It is thus possible to stably detect a positional displacement of each distance sensor based on comparison results of position information acquired in the overlapping detection areas.

The present invention is not limited to the embodiments described above. The following modified embodiments of the construction machine according to the present invention may be implemented.

Figure 9:
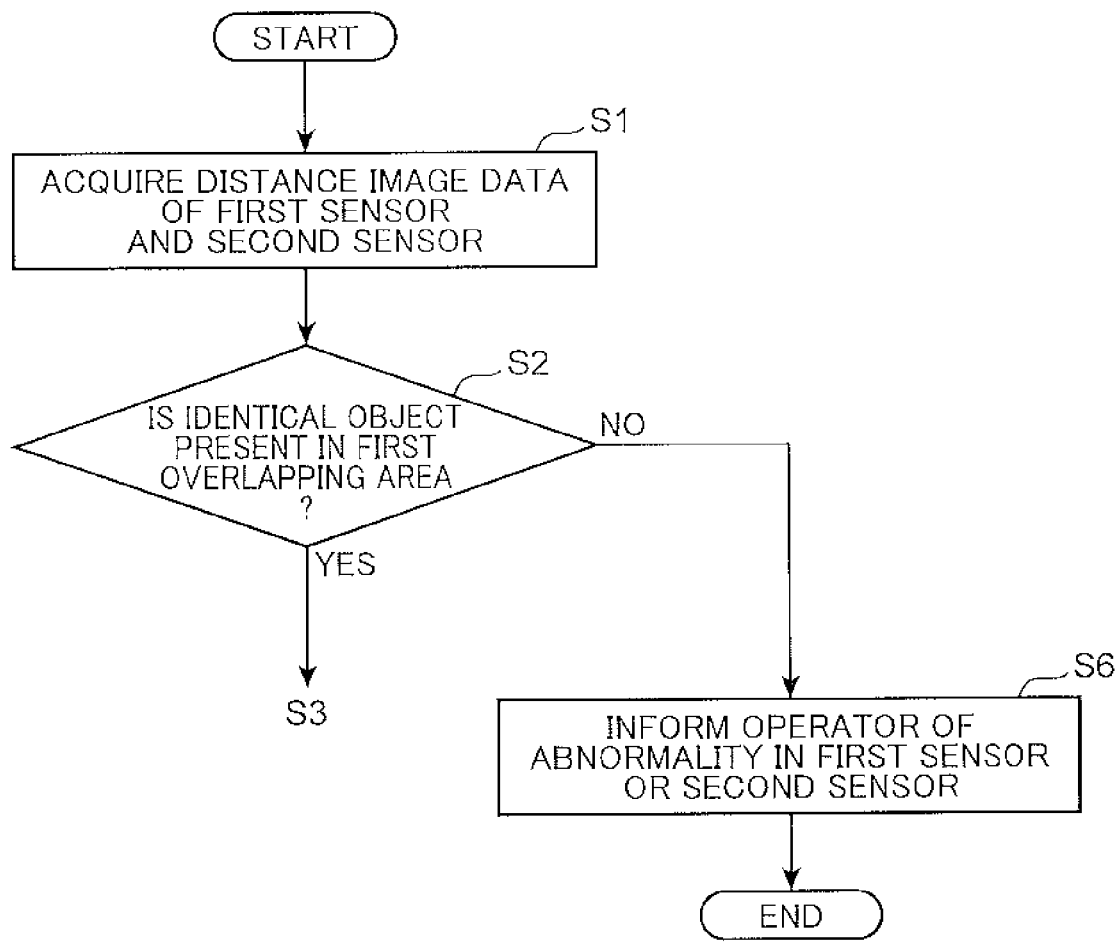
FIG. 9 is a flowchart of a part of a positional displacement detection operation in a construction machine according to a modified embodiment of the present invention.

(1) While the embodiments have described that at step S2 in FIG. 7, when the identical object S is not found in the first overlapping area Q1 by the first distance sensor 111 and the second distance sensor 112 (NO at step S2), the process returns to step S1 and the positional displacement detection unit 121 acquires again distance image data of each distance sensor, the present invention is not limited to that case. FIG. 9 is a flowchart for a part of a positional displacement detection operation in a construction machine according to a modified embodiment of the present invention. In FIG. 9, a part of FIG. 7 is extracted and modified. With reference to FIG. 9, in the present modified embodiment, when the identical object S is not found in the first overlapping area Q1 by the first distance sensor 111 and the second distance sensor 112 at step S2 (NO at step S2), the positional displacement detection unit 121 informs the informing unit 140 or the like of an abnormality in the first distance sensor 111 or the second distance sensor 112 (step S6). That is, when the object S is found in the first overlapping area Q1 by one sensor but is not found by the other sensor, any one of these sensors may malfunction. Alternatively, a positional displacement may be generated in one of these sensors, so that the detection area of the corresponding sensor significantly deviates from the first overlapping area Q1 set at the time of shipment from the factory. As described above, when detection results of a target in an identical overlapping detection area are different between two distance sensors in the present modified embodiment, it is possible to immediately inform an operator of an abnormality in the distance sensor.

(2) While a plurality of distance sensors are disposed on the upper slewing body 3 of the construction machine 1 in the embodiments described above, the present invention is not limited to that case. In particular, the body 1A of the construction machine 1 is not limited to the body including the lower travelling body 2 and the upper slewing body 3, and may be a body constituted by only the body 1A.

Figure 10:
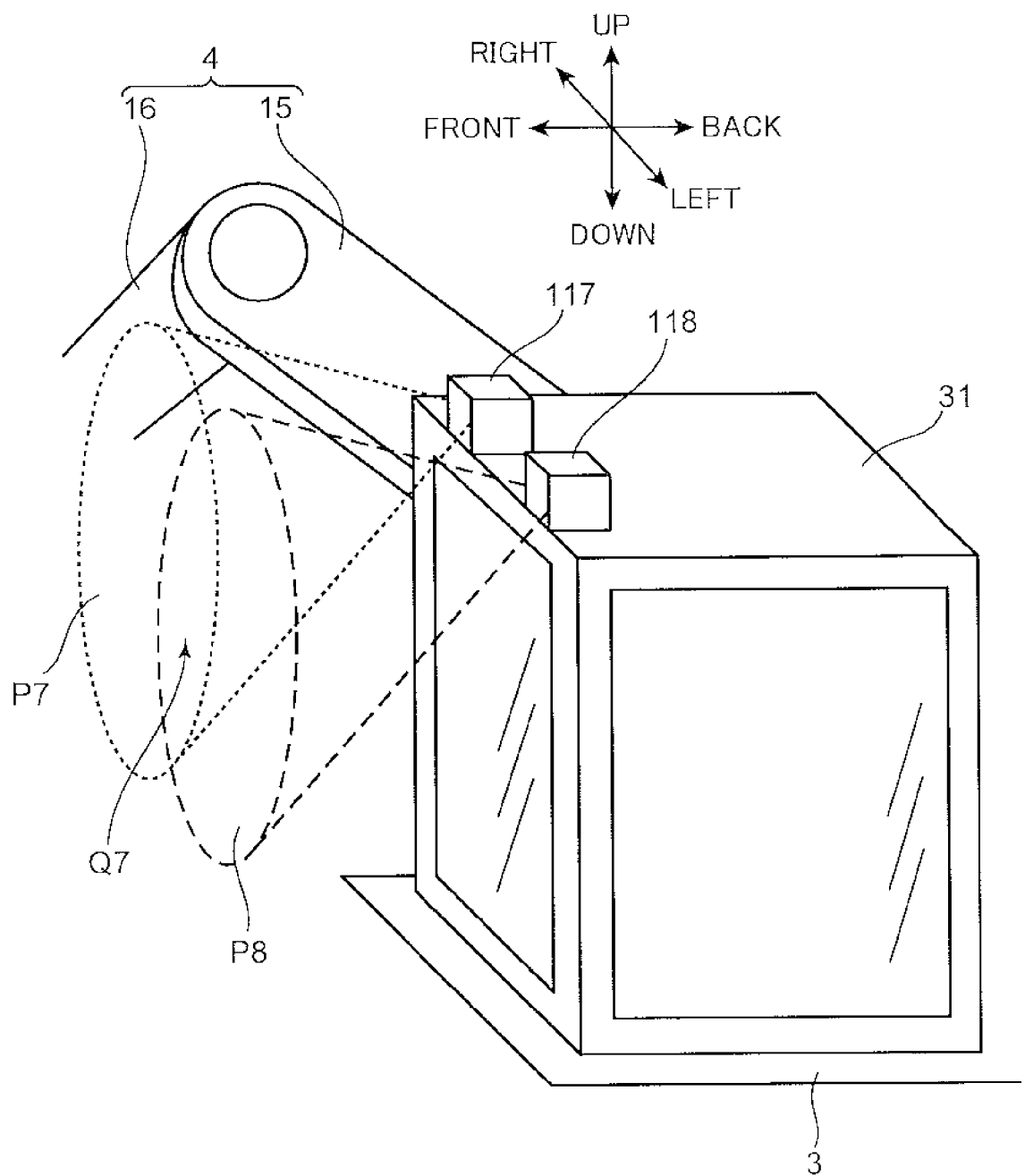
FIG. 10 is a perspective view illustrating detection areas of a plurality of distance sensors in the construction machine according to the modified embodiment of the present invention.

(3) While a plurality of distance sensors are disposed in the construction machine 1 as illustrated in FIG. 4 in the embodiments described above, the present invention is not limited to that case. FIG. 10 is a perspective view illustrating detection areas of a plurality of distance sensors in the construction machine according to the modified embodiment of the present invention. According to the present modified embodiment, a box-shaped cab 31 is disposed on the upper slewing body 3 and the operation attachment 4 is disposed on the right side of the cab 31 so as to be adjacent to the cab 31. The operation attachment 4 includes the boom 15 capable of derricking with respect to the upper slewing body 3 and the arm 16 that is rotatably coupled to the boom 15. In the present modified embodiment, a seventh distance sensor 117 and an eighth distance sensor 118 are disposed on a front end portion of a top panel (roof) of the cab 31 at an interval. The seventh distance sensor 117 has a seventh sensor detection area P7 with a conical shape extending forward. Similarly, the eighth distance sensor 118 has an eighth sensor detection area P8 with a conical shape extending forward. The seventh distance sensor 117 and the eighth distance sensor 118 form a seventh overlapping area Q7 where the seventh detection area and the eighth detection area partially overlap. In such a configuration, the positional displacement detection unit 121 (FIG. 2) can detect a positional displacement of at least one of the seventh distance sensor 117 and the eighth distance sensor 118 with respect to the cab 31 based on position information of a predetermined target placed in the seventh overlapping area Q7.

(4) While the embodiments have described that a plurality of distance sensors are six distance sensors as illustrated in FIG. 4, the present invention is not limited to that case. Two or more sensors may be provided. In this case, the range of a detection area may be adjusted based on the number of sensors so that adjacent detection areas overlap.

(5) While a distance sensor is used as the detection unit of the present invention in the embodiments described above, the present invention is not limited to that case. A plurality of cameras may be disposed, as a plurality of detection units, on the upper slewing body 3 at predetermined intervals. In this case, the positions of the cameras are set such that fields of view (detection areas) of adjacent cameras partially overlap. Each camera acquires image data corresponding to the environment data of the present invention. The position information acquisition unit 125 acquires position information of a target placed in the field of view from the image data acquired by each camera. Information that indicates positional relationships between the fields of view of adjacent cameras may be stored in the storage unit 124 in advance during the initial state of the construction machine 1 (at the time of shipment after manufacturing). At the usage site of the construction machine 1, the positional relationship between the fields of view of the adjacent cameras may be calculated again using the position information of the target acquired by the two adjacent cameras to detect a positional displacement of any of the cameras.

The present invention provides a construction machine. The construction machine includes a body, a plurality of detection units that are disposed on the body and detect environment data indicating information about a surrounding environment of the body, the detection units being disposed so as to allow detection areas of adjacent detection units among the detection units to partially overlap, a position information acquisition unit that acquires position information of a target placed in the detection area from the environment data detected by each of the detection units, and a positional displacement detection unit, where when a predetermined target is placed in an overlapping detection area where the detection area of one detection unit among the detection units overlaps the detection area of the other detection unit adjacent to the one detection unit, the positional displacement detection unit compares the position information of the target that is acquired from the environment data of the one detection unit by the position information acquisition unit to the position information of the target that is acquired from the environment data of the other detection unit by the position information acquisition unit to detect a positional displacement of at least one of the one detection unit and the another detection unit with respect to the body.

According to this configuration, it is possible to detect a positional displacement of the detection unit by comparing pieces of position information of an identical target acquired from pieces of environment data of adjacent detection units.

In the above configuration, the body desirably includes a lower travelling body and an upper slewing body capable of slewing about a vertically extending axis on the lower travelling body, and the detection units are desirably disposed on the upper slewing body.

According to this configuration, it is possible to detect positional displacements of the detection units disposed on the upper slewing body. If the upper slewing body is slewed with respect to the lower travelling body, it is possible to always keep the overlapping detection area.

In the above configuration, the detection units are desirably disposed along a slewing direction of the upper slewing body, and a plurality of the overlapping detection areas are desirably formed along the slewing direction at intervals.

According to this configuration, detection areas of the detection units are arranged around the upper slewing body and thus an operation of the construction machine can be safely performed. In addition, it is possible to stably detect a positional displacement of each detection unit based on comparison results of position information acquired in the overlapping detection areas.

In the above configuration, the detection units are desirably a plurality of distance sensors each of which detects distance image data indicating a distance distribution of a surrounding environment of the body as the environment data.

According to this configuration, the position information acquisition unit can acquire position information of a target placed in the detection area based on the distance image data detected by the distance sensor.

In the above configuration, the distance sensors desirably include a first distance sensor, a second distance sensor, and a third distance sensor that is adjacent to the second distance sensor on an opposite side to a side at which the first distance sensor is disposed, when a predetermined first target is placed in a first overlapping detection area where the detection area of the first distance sensor overlaps the detection area of the second distance sensor, the positional displacement detection unit desirably compares first position information of the first target that is acquired from the distance image data of the first distance sensor by the position information acquisition unit to second position information of the first target that is acquired from the distance image data of the second distance sensor by the position information acquisition unit, when a predetermined second target is placed in a second overlapping detection area where the detection area of the second distance sensor overlaps the detection area of the third distance sensor, the positional displacement detection unit desirably compares third position information of the second target that is acquired from the distance image data of the second distance sensor by the position information acquisition unit to fourth position information of the second target that is acquired from the distance image data of the third distance sensor by the position information acquisition unit, and the positional displacement detection unit desirably detects a positional displacement of the second distance sensor based on a result of comparison between the first position information and the second position information and a result of comparison between the third position information and the fourth position information.

According to this configuration, it is possible to detect a positional displacement of the second distance sensor with high precision based on results of comparison of position information between the first distance sensor and the second distance sensor and between the second distance sensor and the third distance sensor.

In the above configuration, the positional displacement detection unit desirably applies predetermined possibly-positional-displacement information to two adjacent distance sensors when a difference in the position information of the two adjacent distance sensors exceeds a predetermined threshold, desirably applies predetermined no-positional-displacement information to the two adjacent distance sensors when a difference in the position information is less than or equal to the threshold, and desirably detects the positional displacement of the distance sensor based on a number of pieces of the possibly-positional-displacement information applied to the distance sensor.

According to this configuration, it is possible to detect a final positional displacement while the possibility of a positional displacement of each distance sensor being accumulated based on a result of comparison between adjacent distance sensors.

In the above configuration, when the predetermined target is included in the overlapping detection area in the distance image data of one distance sensor and is not included in the overlapping detection area in the distance image data of the another distance sensor, the positional displacement detection unit desirably determines that an abnormality occurs in one of the one distance sensor and the another distance sensor.

According to this configuration, when detection results of a target in an identical overlapping detection area are different between two distance sensors, it is possible to detect an abnormality in the distance sensor.

In the above configuration, the construction machine desirably further includes a data correction unit that corrects the distance image data of at least one of the one distance sensor and the other distance sensor based on a difference between the position information that is acquired from the distance image data of the one distance sensor by the position information acquisition unit and the position information that is acquired from the distance image data of the other distance sensor by the position information acquisition unit.

According to this configuration, it is possible to correct the distance image data of the distance sensor using a difference in the position information of the target in the identical overlapping detection area between two distance sensors.

In the above configuration, the position information desirably includes three-dimensional absolute coordinate information.

According to this configuration, it is possible to detect a positional displacement of the distance sensor with high precision based on a three-dimensional absolute coordinate.

In the above configuration, the distance sensor desirably includes a light source that irradiates infrared light and a camera that receives reflected light of the infrared light.

According to this configuration, it is possible to achieve a stable detection operation of the distance sensor by the light source that irradiates infrared light and the camera.

In the above configuration, the distance sensor desirably includes a stereo camera.

According to this configuration, it is possible to achieve the stable detection operation of the distance sensor by the stereo camera.

The invention claimed is:

1. A construction machine comprising:
a body;
a plurality of detection units that are disposed on the body and detect environment data indicating information about a surrounding environment of the body, the plurality of detection units being disposed so as to allow detection areas of adjacent detection units among the plurality of detection units to partially overlap;
a position information acquisition unit that acquires position information of a target placed in the detection area from the environment data detected by each of the detection units; and
a positional displacement detection unit, when a predetermined target is placed in an overlapping detection area where the detection area of one detection unit among the plurality of detection units overlaps the detection area of another detection unit adjacent to the one detection unit, compares the position information of the target that is acquired from the environment data of the one detection unit by the position information acquisition unit to the position information of the target that is acquired from the environment data of the other detection unit by the position information acquisition unit to detect a positional displacement of at least one of the one detection unit and the another detection unit with respect to the body.

2. The construction machine according to claim 1, wherein
the body includes a lower travelling body and an upper slewing body capable of slewing about a vertically extending axis on the lower travelling body, and
the plurality of detection units are disposed on the upper slewing body.

3. The construction machine according to claim 2, wherein
the plurality of detection units are disposed along a slewing direction of the upper slewing body, and
a plurality of the overlapping detection areas are formed along the slewing direction at intervals.

4. The construction machine according to claim 1, wherein the plurality of detection units are a plurality of distance sensors each of which detects distance image data indicating a distance distribution of a surrounding environment of the body as the environment data.

5. The construction machine according to claim 4, wherein
the distance sensors include a first distance sensor, a second distance sensor, and a third distance sensor that is adjacent to the second distance sensor on an opposite side to a side at which the first distance sensor is disposed, when a predetermined first target is placed in a first overlapping detection area where the detection area of the first distance sensor overlaps the detection area of the second distance sensor, the positional displacement detection unit compares first position information of the first target that is acquired from the distance image data of the first distance sensor by the position information acquisition unit to second position information of the first target that is acquired from the distance image data of the second distance sensor by the position information acquisition unit, when a predetermined second target is placed in a second overlapping detection area where the detection area of the second distance sensor overlaps the detection area of the third distance sensor, the positional displacement detection unit compares third position information of the second target that is acquired from the distance image data of the second distance sensor by the position information acquisition unit to fourth position information of the second target that is acquired from the distance image data of the third distance sensor by the position information acquisition unit, and the positional displacement detection unit detects a positional displacement of the second distance sensor based on a result of comparison between the first position information and the second position information and a result of comparison between the third position information and the fourth position information.

6. The construction machine according to claim 4, wherein the positional displacement detection unit applies predetermined possibly-positional-displacement information to two adjacent distance sensors when a difference in the position information of the two adjacent distance sensors exceeds a predetermined threshold, applies predetermined no-positional-displacement information to the two adjacent distance sensors when a difference in the position information is less than or equal to the threshold, and detects the positional displacement of the distance sensor based on a number of pieces of the possibly-positional-displacement information applied to the distance sensor.

7. The construction machine according to claim 4, wherein when the predetermined target is included in the overlapping detection area in the distance image data of one distance sensor and is not included in the overlapping detection area in the distance image data of the another distance sensor, the positional displacement detection unit determines that an abnormality occurs in one of the one distance sensor and the another distance sensor.

8. The construction machine according to claim 4, further comprising a data correction unit that corrects the distance image data of at least one of the one distance sensor and the other distance sensor based on a difference between the position information that is acquired from the distance image data of the one distance sensor by the position information acquisition unit and the position information that is acquired from the distance image data of the other distance sensor by the position information acquisition unit.

9. The construction machine according to claim 4, wherein the distance sensor includes a light source that irradiates infrared light and a camera that receives reflected light of the infrared light.

10. The construction machine according to claim 4, wherein the distance sensor includes a stereo camera.

11. The construction machine according to claim 1, wherein the position information includes three-dimensional absolute coordinate information.

* * * * *